United States Patent [19]
Umebayashi et al.

[11] Patent Number: 5,756,130
[45] Date of Patent: May 26, 1998

[54] STAMPER FOR PRODUCING RECORDING MEDIUM

[75] Inventors: Nobuhiro Umebayashi, Tsukuba; Hiroshi Obara, Toride; Hiroshi Ishihama, Shimotsuma; Yoshitaka Kojima; Shoichi Nakashima, both of Hitachi; Shizuka Yamaguchi, Katsuta, all of Japan

[73] Assignees: Hitaci Maxell, Ltd., Osaka; Hitachi, Ltd., Tokyo, both of Japan

[21] Appl. No.: 247,220

[22] Filed: May 17, 1994

[30] Foreign Application Priority Data

May 20, 1993 [JP] Japan .................. 5-118519
Jul. 16, 1993 [JP] Japan .................. 5-176897

[51] Int. Cl.$^6$ .................. B29C 33/38; B32B 3/00
[52] U.S. Cl. .................. 425/385; 249/114.1; 249/116; 425/403; 425/810; 428/469; 428/472; 428/622; 428/629
[58] Field of Search .................. 249/114.1, 115, 249/116; 425/406, 403, 810, 470, 385, 394; 428/622, 627, 628, 629, 469, 472

[56] References Cited

U.S. PATENT DOCUMENTS

| | | | |
|---|---|---|---|
| 3,962,495 | 6/1976 | Feldstein | 425/810 |
| 4,262,875 | 4/1981 | Nyman et al. | 249/114.1 |
| 4,723,903 | 2/1988 | Okazaki et al. | 425/810 |
| 4,753,414 | 6/1988 | McCandless | 249/114.1 |
| 4,793,792 | 12/1988 | Akino | 425/810 |
| 4,953,385 | 9/1990 | Aoki et al. | 425/810 |
| 5,176,839 | 1/1993 | Kim | 249/114.1 |
| 5,234,633 | 8/1993 | Imataki et al. | 425/810 |
| 5,246,787 | 9/1993 | Schulz et al. | 249/135 |
| 5,388,803 | 2/1995 | Baumgartner et al. | 249/114.1 |
| 5,431,367 | 7/1995 | Baumgartner et al. | 249/114.1 |
| 5,489,082 | 2/1996 | Imataki et al. | 249/114.1 |

FOREIGN PATENT DOCUMENTS 50-23453  3/1975  Japan .................. 425/810

Primary Examiner—James P. Mackey

[57] ABSTRACT

There is provided a stamper for producing a recording medium exhibiting excellent durability and capable of stably forming projections and pits and a method of producing the stamper. A stamper for producing a recording medium comprising projections and pits in a predetermined pattern on the surface thereof, wherein a value of $\tan \theta^{-1}$ obtainable from an enlargement angle $\theta$ of an output from a cartridge with respect to an enlargement of an output denoting a load measured by a test of scratching the surface having the projections and pits under conditions that a diameter of a stylus is 100 µm and a loading speed of 1 µm/second is 1.3 or more.

4 Claims, 12 Drawing Sheets

STAMPER FOR PRODUCING RECORDING MEDIUM

BACKGROUND OF THE INVENTION

1. Field of the Invention

The present invention relates to a stamper for use to produce a recording medium, such as a flexible magnetic disk or optical disk.

2. Description of the Related Art

There has been known a flexible magnetic disk having an arrangement that a reference track is formed in the innermost portion of an annular recording region, a multiplicity of annular recesses for tracking a magnetic head are formed outwardly apart from said reference track by predetermined intervals and concentrically with said reference track and regions between the tracking recesses are made to be data tracks.

In order to simultaneously form a multiplicity of tracking recesses in one flexible magnetic disk, a stamper has been employed which has a multiplicity of projections corresponding to the tracking recesses and which is secured to a mold base. A method has been employed in which a magnetic layer is formed on a base film and then the stamper is pressed against the upper surface of the magnetic layer under a predetermined pressure so that the projections of the stamper is pressed into the magnetic layer and thus the tracking recesses are formed.

The stamper has been made of nickel because fine projections and pits can easily be formed and it has been usually manufactured by electrolytic plating method. Therefore, the Vickers hardness has been relatively low (Vickers hardness of 280 to 300), thus resulting in deformation of the projections of the stamper due to grinding powder mixed in the magnetic layer or the like. As a result, the tracking recess initially in the form of a rectangular cross sectional shape is deformed into an elliptic shape. Moreover, sagging takes place in the peripheral portion of the tracking recess, causing sharp edges to be eliminated. Therefore, the opening of the tracking recess is enlarged. As a result, there arises a problem in that the optical characteristics deteriorate and, therefore, tracking servo cannot be performed accurately.

In order to prevent the foregoing problem, the deformation of the projections of the stamper must always be supervised or monitored to replace the stamper encountered the deformation by a new stamper. Therefore, the operations of supervising or monitoring and replacing the stamper must be performed, and the foregoing complicated operations deteriorate the production yield.

SUMMARY OF THE INVENTION

A first object of the present invention is to provide a stamper for producing a recording medium which is capable of overcoming the problems experienced with the conventional technology which exhibits excellent durability and which enables stable projections and pits to be formed.

A second object of the present invention is provide a method of producing a recording medium capable of, with excellent mass production efficiency, producing a stamper for producing a recording medium which exhibits excellent durability and which is capable of forming stable projections and pits.

In order to achieve the first object, a first aspect of the present invention provides a stamper for producing a recording medium comprising projections and pits in a predetermined pattern, such as recesses for tracking a magnetic head, pregrooves or prepits, on the surface thereof, wherein a value of $\tan \theta^{-1}$, i.e. $1/\tan \theta$, obtainable from an enlargement angle $\theta$ of an output from a cartridge with respect to an enlargement of an output denoting a load measured by a test of scratching the surface having the projections and pits under conditions that a diameter of a stylus is 100 μm and a loading speed of 1 μm/second is 1.3 or more, preferably 1.7 or more.

To achieve the first object, according to a second aspect of the present invention, there is provided a stamper for producing a recording medium comprising projections and pits in a predetermined pattern, such as recesses for tracking a magnetic head, pregrooves or prepits, on the surface thereof, wherein nickel nitride is present in the surface layer having the projections and pits.

To achieve the first object, according to a third aspect of the present invention, there is provided a stamper for producing a recording medium comprising projections and pits in a predetermined pattern, such as recesses for tracking a magnetic head, pregrooves or prepits, on the surface thereof, wherein a titanium nitride film is formed on the surface layer having the projections and pits.

To achieve the first object, a fourth aspect of the present invention is characterized in that at least a base layer made of, for example, nickel, a hard layer formed on the surface and made of, for example, titanium oxide, and an intermediate layer interposed between the base layer and the hard layer and made of, for example, nickel oxide or a mixture of nickel oxide and titanium oxide, are provided, an element-mixed region in which main elements for forming the base layer and those for forming the intermediate layer, for example, nickel and oxygen or nickel, oxygen and titanium, are mixed with one another is formed between the base layer and the intermediate layer, and the hard layer is formed due to growth of crystal on a surface of the intermediate layer on which the crystal is formed.

To achieve the second object, a fifth aspect of the present invention provides a method of producing a stamper for manufacturing a recording medium comprising projections and pits, such as recesses for tracking a magnetic head, pregrooves or prepits, in a predetermined pattern on the surface thereof, the method of producing a stamper comprising steps of:

producing a stamper base having the projections and pits by, for example, an electrolytic plating method;

cutting the stamper base to have a predetermined size; and subjecting the surface having the projections and pits to a hardening process, in which ions of, for example, carbon, are implanted or injected, or a hard layer is formed by sputtering or vapor-depositing nickel oxide, cobalt oxide or titanium carbide, after the cutting step has been performed.

According to the first to fourth aspects of the present invention, the hardness of the stamper can be improved significantly. Therefore, the deformation of the projections and pits can be prevented even if the stamper is used for a long time. Thus, the durability of the stamper can be improved.

The fifth aspect of the present invention is arranged in such a manner that the base of the stamper is cut to have a predetermined size and the hardening process is performed. Therefore, the blade portion of the cutting machine can be prevented, thus enabling the cutting machine to be used continuously, thereby realizing excellent mass production facility.

Other and further objects, features and advantages of the invention will be appear more fully from the following description.

DESCRIPTION OF PREFERRED EMBODIMENTS

Figure 1:
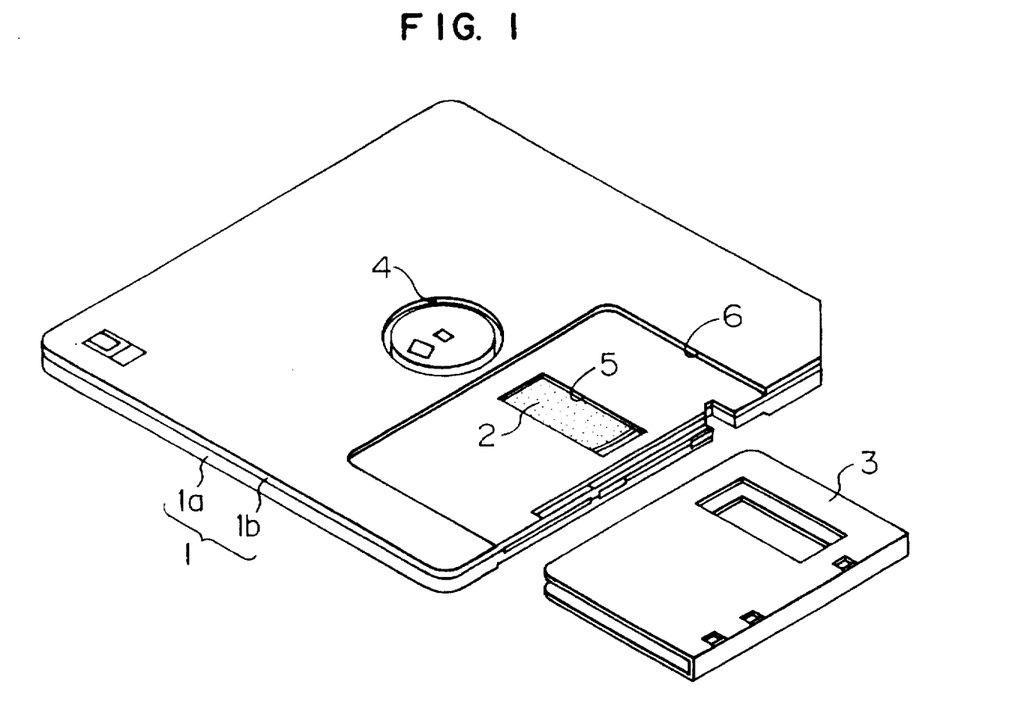
FIG. 1 is a partially-exploded perspective view which illustrates a magnetic disk cartridge according to an embodiment of the present invention.
Figure 2:
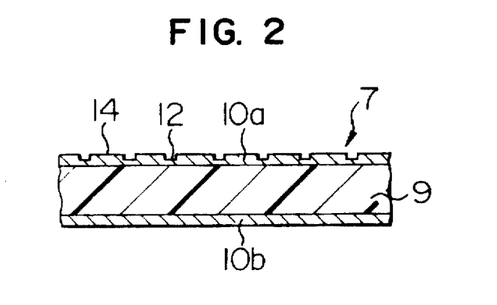
FIG. 2 is an enlarged cross sectional view which illustrates a magnetic sheet.
Figure 3:
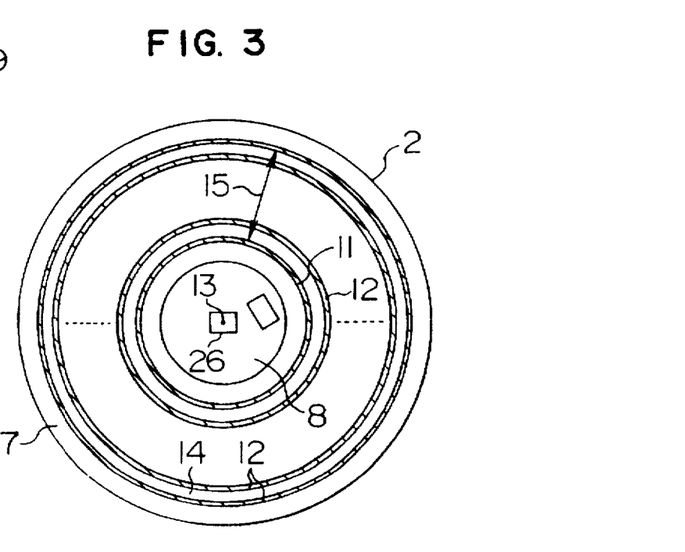
FIG. 3 is a plan view which illustrates a magnetic disk.

Preferred embodiments of the present invention will now be described. FIG. 1 is a perspective view which illustrates an exploded portion of a magnetic disk cartridge according to an embodiment. FIG. 2 is an enlarged cross sectional view which illustrates a magnetic sheet, and FIG. 3 is a plan view which illustrates a magnetic disk.

As shown in FIG. 1, the magnetic disk cartridge is mainly composed of a cartridge case 1, a magnetic disk 2 rotatively accommodated in the cartridge case 1, a shutter 3 slidably attached to the cartridge case 1 and a cleaning sheet (omitted from illustration) secured to the inner surface of the cartridge case 1 by welding.

The cartridge case 1 is composed of an upper case 1a and a lower case 1b which are made of an injection-molded hard synthetic resin, for example, an ABS resin.

The lower case 1b has, in substantially the central portion thereof, an opening 4 through which a rotation drive shaft is inserted. A heat insertion port 5 in the form of a rectangle is formed adjacent to the opening 4. A heat insertion port 5 (omitted from illustration) is similarly formed in the upper case 1a.

A recess 6 is formed adjacent to the front surfaces of the upper case 1a and the lower case 1b, the recess 6 being somewhat lowered in order to restrict the sliding range for the shutter 3. The recess 6 has, at an intermediate position thereof, the head insertion port 5.

The magnetic disk 2 is composed of an annular and flexible magnetic sheet 7 and a metal or synthetic-resin center hub 8 inserted into a central hole of the magnetic sheet 7 and secured by bonding.

The magnetic sheet 7 is, as shown in FIG. 2, composed of a base film 9 and magnetic layers 10a and 10b formed on the two sides of the base film 9. It should be noted that FIG. 2 is a cross sectional view taken along the radial direction of the magnetic disk 2.

The base film 9 comprises a synthetic-resin film, for example, polyethylene terephthalate (PET), polyethylene naphthalate (PEN) or polyimide.

The magnetic layers 10a and 10b are made of a mixed substance of ferromagnetic powder, a binder, a polishing powder and lubricant and the like.

As the ferromagnetic powder, for example, any of the following substances is employed: barium ferrite, α—Fe, Co—Ni, Co—P, γ—$Fe_2O_3$, $Fe_3O_4$, Co—contained γ—$Fe_2O_3$, Co—contained γ—$Fe_3O_4$, $CrO_2$, Co and Fe—Ni.

For example, copolymer of vinyl chloride and vinyl acetate, copolymer of vinyl chloride, vinyl acetate and vinyl alcohol, urethane resin, polyisocyanate compound, radiation-cured resin or the like is used as the binder.

For example, aluminum oxide, chromium oxide, silicon carbide, silicon nitride or the like is used as the polishing powder. It is preferable that the ratio of addition of the polishing powder be 0.1 to 25 wt % with respect to the magnetic powder.

For example, higher fatty acid such as stearic acid or oleic acid, ester of these higher fatty acids, liquid paraffin, squalane, fluorine resin, fluorine oil or the like can be used as the lubricant. It is preferable that the ratio of addition of the lubricant be 0.1 to 25 wt % with respect to the magnetic powder.

An example of the specific composition of the magnetic paint is as follows.

Example of Composition of Magnetic Paint

| | |
|---|---|
| Barium ferrite (Hc: 530 Oe, magnitude of saturation magnetization: 57 emu/g, average particle size: 0.04 μm) | 100 parts by weight |
| Copolymer of vinyl chloride, vinyl acetate and vinyl alcohol | 11.0 parts by weight |
| Urethane resin | 6.8 parts by weight |
| Ternary functional isocyanate compound | 4.4 parts by weight |
| Aluminum oxide powder (average particle size: 0.43 μm) | 15 parts by weight |
| Carbon black | 2 parts by weight |
| Oleyl oleate | 7 parts by weight |
| Cyclohexane | 150 parts by weight |
| Toluene | 150 parts by weight |

The composition shown in the Example of Composition of Magnetic Paint is sufficiently mixed and dispersed in a ball mill to prepare a magnetic paint and thus obtained magnetic paint is applied so that the applied magnetic paint has a dry average thickness of 0.79 μm. After the magnetic paint is dried, it was subjected to a calendar process to form the magnetic layers 10a and 10b, respectively.

A reference track 11 is, as shown in FIG. 3, formed by an embossing process in the innermost portion of the surface of the magnetic layer 10a of thus-constituted magnetic disk 2. A multiplicity of servo tracks 12 and data tracks 14 in the form of concentric circles relative to a rotation center 13 of the magnetic disk 2 are alternately formed in a recording region 15 formed on the outside of the reference track 11. Each of the servo tracks 12 has, therein, continuous or discontinuous tracking recesses 23 formed by an embossing process. Thus, desired data can be recorded on the data tracks 14.

Figure 4:
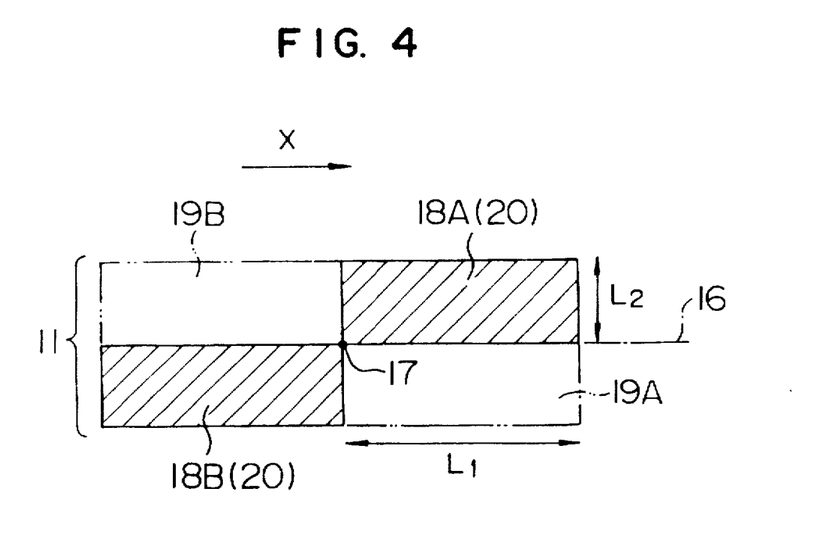
FIG. 4 is a partially-enlarged plan view which illustrates a reference track.

The reference track 11 extends in direction X of rotation of the magnetic disk 2 as shown in FIG. 4, the reference track 11 being composed of pairs each consisting of a recess region 18A for reference and a recess region 18B for reference each in the form of a rectangular shape and positioned point symmetry with respect to an arbitrary point of a central line 16 of the reference track 11. Flat portions 19A and 19B each having no recess region are formed adjacent to the recess region 18A for reference (in front of the recess region 18B for reference) and adjacent the recess region 18B (in the rear of the recess region 18B for reference), respectively.

A multiplicity of the pairs each consisting of the recess regions 18A and 18B for reference and flat portions 19A and 19B are continuously or discontinuously formed along the direction X of rotation of the magnetic disk 2 so that the reference track 11 is formed.

In this embodiment, the length L1 of the recessed regions 18A and 18B for reference in the direction of rotation of the magnetic head is 2.4 mm and the length L2 in the direction of the width is 18 μm.

A predetermined signal has been recorded on the reference track 11. Thus, the central position of the magnetic head (a magnetic gap) can be brought onto the central line 16 of the reference track 11 in accordance with an output waveform obtained due to scanning of the upper surface of the reference track 11 by the magnetic head.

As described above, the magnetic head (the magnetic gap) is brought onto the central line of the reference track 11, that is, to the reference position and simultaneously a photodetector (to be described later) comprising a light emitting device and a light receiving device group detects the present position of the photodetector between the servo tracks 12 so that the quantity of the positional deviation of the photodetector from the servo track 12 is calculated and stored.

Then, a motor for moving the magnetic head carriage is rotated so that the central position of the magnetic head is moved closer to the central line of the innermost data track 14.

The tracking servo of the magnetic head is performed for each track by using two servo tracks 12.

Figure 5:
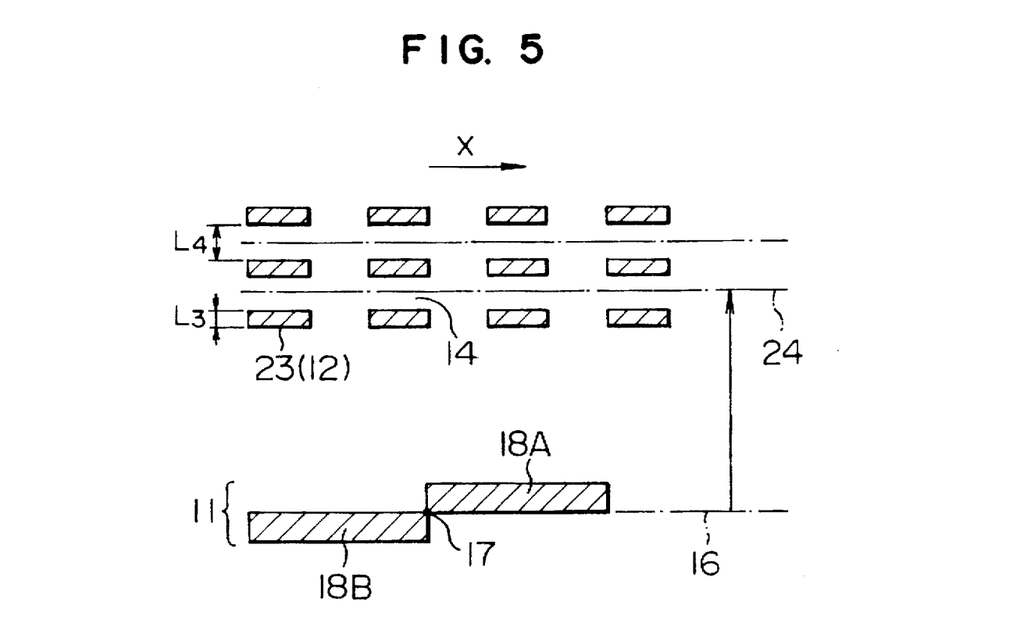
FIG. 5 is a view which illustrates the reference track, servo tracks and data tracks.

In this embodiment, tracking recesses 23 are discontinuously formed as shown in FIG. 5. The width L3 of the tracking recess 23 is 5 μm and the width L4 of the data track 14 is 15 μm.

Figure 6:
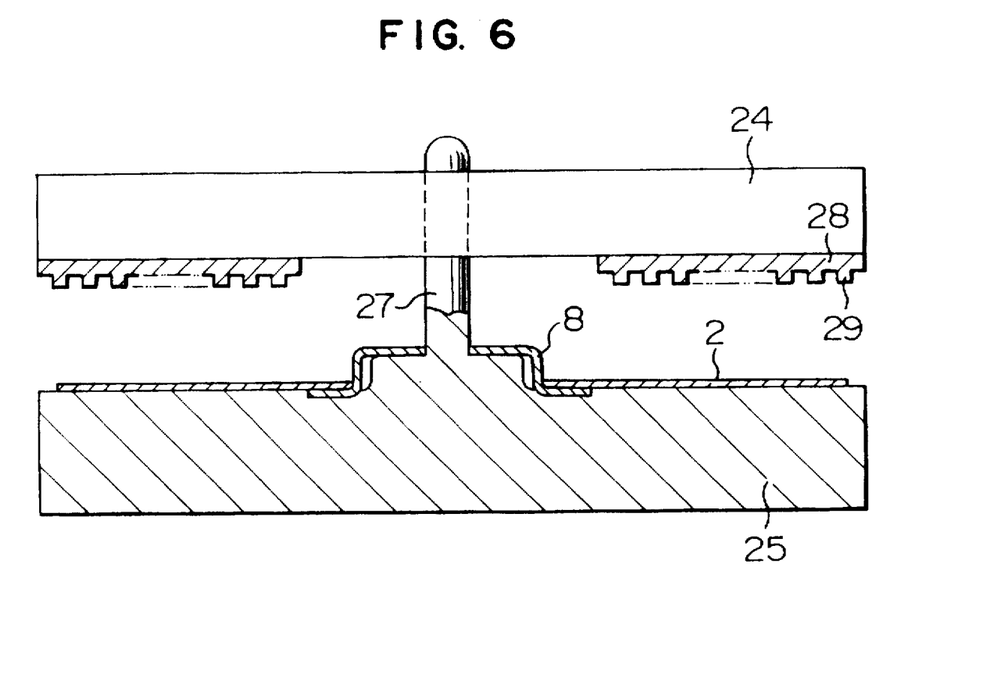
FIG. 6 is a cross sectional view which illustrates an essential portion of a state of stamping a magnetic disk.

The recess regions 18A and 18B for reference and the tracking recesses 23 are simultaneously formed by a stamper as shown in FIG. 6.

As shown in FIG. 6, a magnetic disk 2 to which a center hub 8 is attached is placed on a base 25. The magnetic disk 2 is subjected to a pre-process so that the surface roughness Ra of each of the magnetic layers 10a and 10b is 0.015 μm or less A center pin to be inserted into the center hub 26 (see FIG. 3) projects over the base 25, thus locating the magnetic disk 2 on the base 25 by inserting the center pin 27 into the central hole 26 of the center hub 26.

The stamper 28 moveable vertically is disposed above the base 25 in such a manner that the stamper 28 is secured to a base 24 and the vertical movement of the stamper 28 is guided by the center pin 27. The stamper 28 has, on the lower surface thereof, a multiplicity of fine projections 29 for forming the tracking recesses 23.

The stamper 28 is, together with the base 24, moved downwards in a state shown in FIG. 6 to press the magnetic disk 2 with a predetermined pressure. As a result, each projection 29 presses the surface of the magnetic layer 10a to partially compress the surface so that tracking recesses 23 each having a substantially rectangular cross sectional shape is formed.

Figure 7:
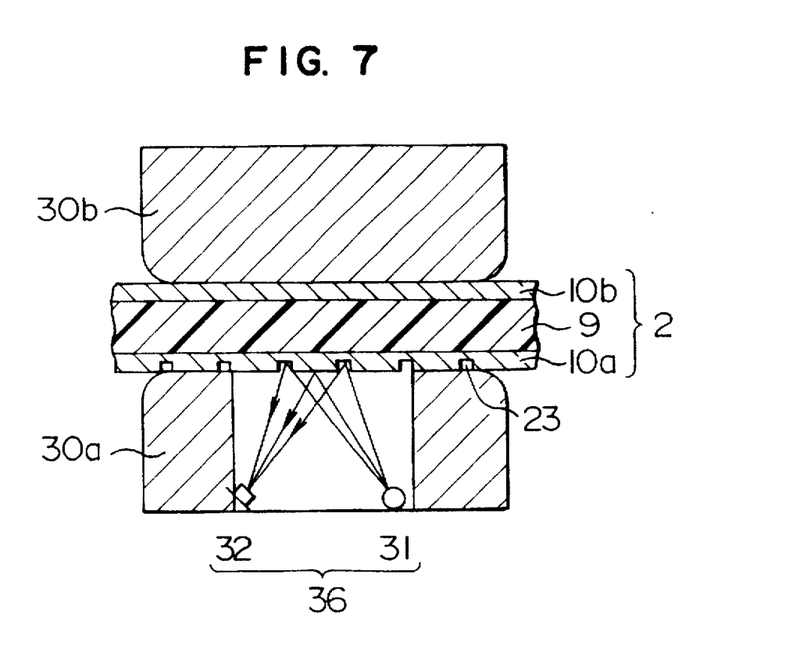
FIG. 7 is a view which illustrates an optical disk.

When data is recorded or reproduced, the magnetic disk 2 is, as shown in FIG. 7, rotated in a state where the magnetic disk 2 is held between magnetic heads 30a and 30b. A photodetector 36, which includes a light emitting device 31 for emitting tracking servo light and comprising, for example, an LED, and a light receiving device group 32 for receiving light reflected by the magnetic layer 10a, is integrally attached to the magnetic head 30a.

Figure 8:
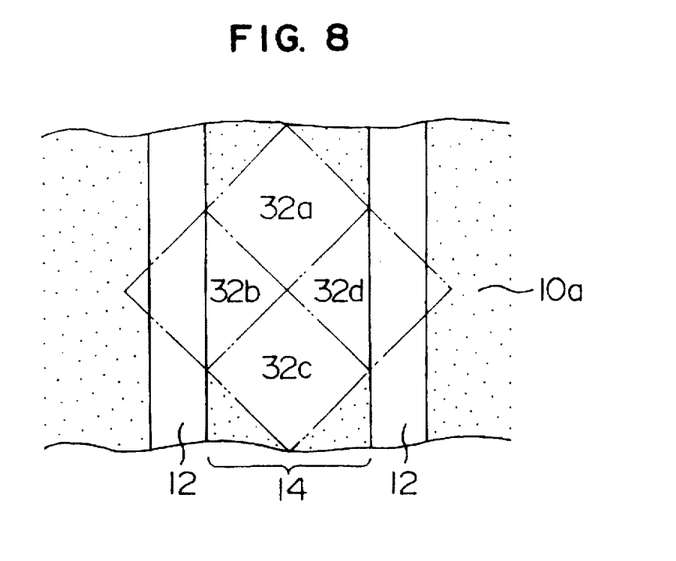
FIG. 8 is a view which illustrates a state of configuration of light receiving devices.
Figure 9:
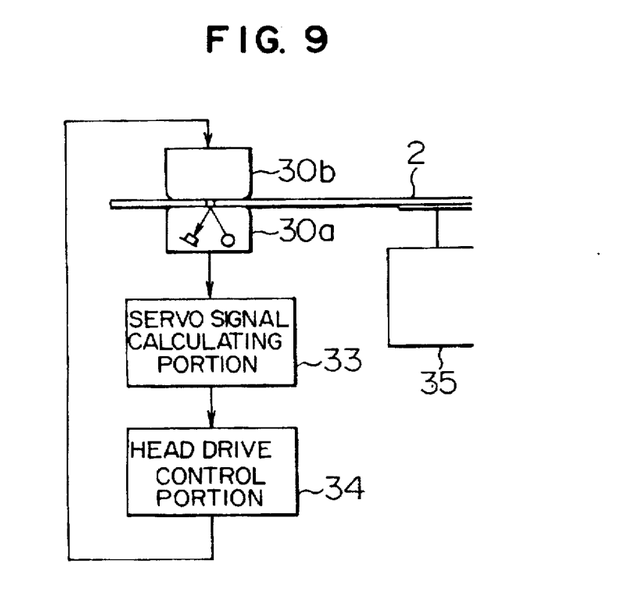
FIG. 9 is a block diagram which illustrates control of tracking of the magnetic head.

The light receiving device group 32 is, as shown in FIG. 8, composed of four light receiving devices 32a, 32b, 32c and 32d. Thus, light beams reflected by the servo tracks 12 and the data tracks 14 are received by the light receiving devices 32a to 32d. The output from each of the light receiving devices 32a to 32d is, as shown in FIG. 9, supplied to a servo signal calculating portion 33. A position modification signal generated by the servo signal calculating portion 33 is supplied to a head-drive control portion 34. In accordance with a control signal generated by the head-drive control portion 34, tracking of the magnetic heads 30a and 30b is controlled.

Since the stamper 28 having innumerable fine projections 29 as described above involves deformation of the projections 29 during use, a variety of investigations have been made to prevent this. As a result, the following effective methods have been found:

(1) A method of forming an amorphous layer on the surface of the stamper 28 by injecting ions, such as carbon ions, into the stamper 28.

(2) A method of forming a hardened film made of nickel oxide or cobalt oxide on the surface layer of the stamper 28.

(3) A method of forming a base layer made of, for example, nickel, a hard layer formed on the surface and made of, for example, titanium nitride, and an intermediate layer formed between the base layer and the hard layer and made of, for example, nickel nitride or titanium oxide, wherein an element-mixture region, in which the main elements of the base layer and the intermediate layer are mixed with one another, is formed between the base layer and the intermediate layer and the hard layer is formed by causing crystal to grow on the crystal-growth-surface of the intermediate layer.

The foregoing methods will now be described specifically. Initially, the flow of the method of manufacturing the stamper will now be described with reference to FIG. 10.

Figure 10:
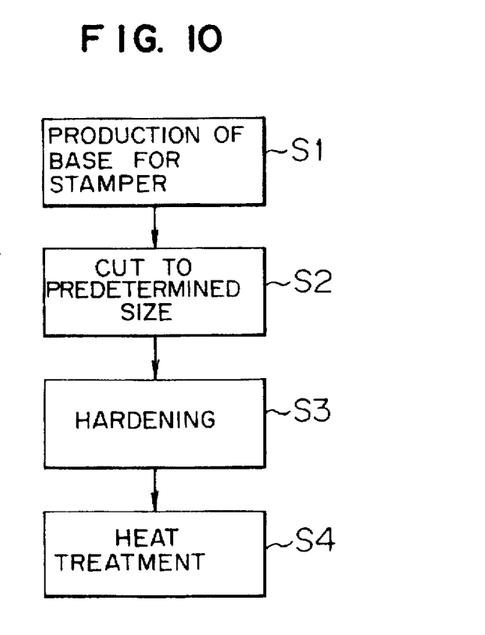
FIG. 10 is a flow chart which illustrates a method of producing a stamper according to the present invention.

In first step S1, a base for the stamper having the innumerable fine projections on the surface thereof is manufactured by electrolytic plating of nickel.

In step S2, the base for the stamper is, by using a cutter, cut to have a predetermined size for, for example, 3.5-inch disk or 5-inch disk.

In next step S3, the surface of the thus-cut base for the stamper is subjected to a hardening process by an adequate means, such as ion implantation or injection, sputtering, vapor deposition or ion plating.

In next step S4, heat treatment for removing deflection is performed so that the stamper is obtained.

Specific examples of the hardening process will now be described.

EXAMPLE 1

Figure 11:
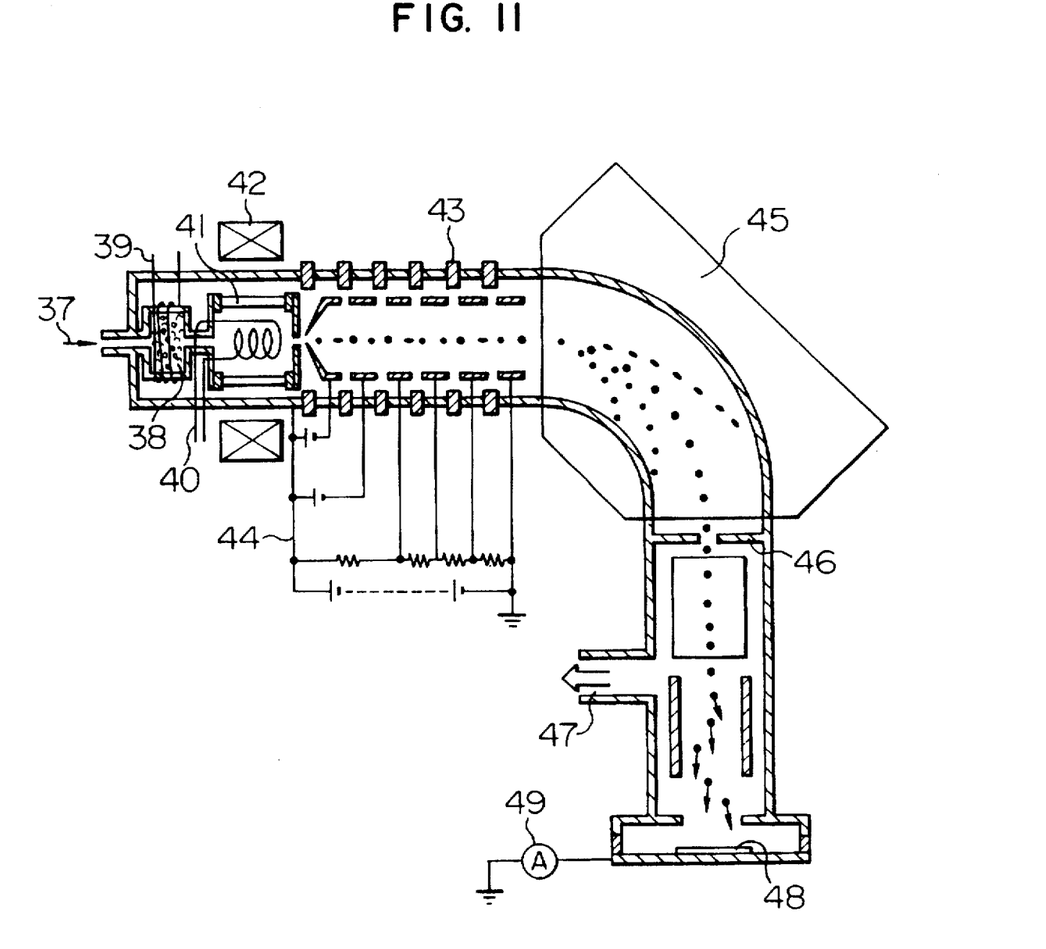
FIG. 11 is a schematic view which illustrates the structure of an ion injection apparatus for use in the embodiment of the present invention.

FIG. 11 is a schematic structural view which illustrates an ion implantation or injection apparatus. The ion injection apparatus is mainly composed of an injection chamber into which material of ions to be injected is introduced, an ion source for ionizing particles which are intended to be injected, a beam optical system for extracting the ions from the ion source to converge and accelerate the ions, an ion selection unit for selecting required ions, a beam scanning unit for uniformly injecting ions over a wide area of the sample, and a vacuum unit for maintaining the inside of the system at a vacuum state.

Specifically, the structure is arranged as shown in FIG. 11. Referring to FIG. 11, reference numeral 37 represents carrier gas, 38 represents material, the ions of which are implanted or injected (carbon in this embodiment), 39 represents a heater, 40 represents a filament (a cathode), 41 represents an anode, 42 represents a coil, 43 represents an insulator, 44 represents an accelerator, 45 represents a magnet, 46 represents a slit, 47 represents an exhaust system, 48 represents a sample (the stamper 28 which has been formed by cutting) into which the ions are injected, and 49 represents an electric current integrating meter.

In this example, the stamper solely made of nickel is formed by electrolytic plating, the stamper 28 serving as a sample 48 being placed in the ion injection apparatus. Then, carbon ions are accelerated and injected at accelerating voltage of 10 to 20 KeV and an electric current of 40 mA so as to be deposited. As a result of the injection of carbon ions, an amorphous carbon layer 50 is formed on the surface of the stamper 28.

Figure 12:
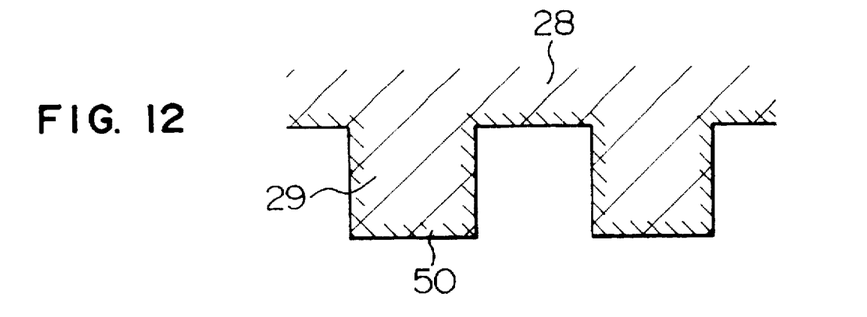
FIG. 12 is a partially-enlarged cross sectional view which illustrates a stamper into which ions are injected.

FIG. 12 is a partially enlarged view which illustrates the stamper 28 having, on the surface thereof, the amorphous layer 50 formed uniformly.

Forming of the amorphous layer 50 on the surface of the stamper 28 is confirmed from that no diffraction ring is formed as a result of reflective electron beam diffraction performed in such a manner that the surface of the stamper 28 is sputter-etched by 20 Å with argon ions.

The material of the stamper 28 according to this embodiment is only nickel (electrolytic nickel) because the pattern composed of the fine projections and pits can be formed. However, the stamper 28 may be made of nickel-base alloy mainly composed of nickel to which phosphorus (P), cobalt (Co), sulfur (S), carbon (C), tungsten (W) and chromium (Cr) are added in a predetermined quantity (for example, 10 to 30 wt %).

EXAMPLE 2

Figure 13:
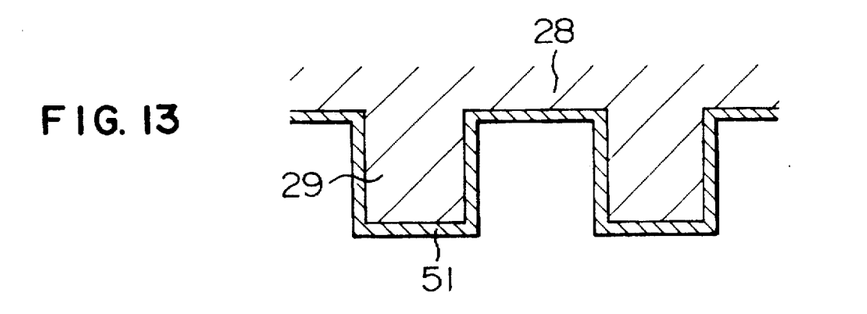
FIG. 13 is a partially-enlarged cross sectional view which illustrates a stamper according to another embodiment of the present invention on which a hard film is formed.

As shown in FIG. 13, a nickel oxide (NiO) layer 51 having a thickness of 0.2 µm is formed on the surface of the stamper 28 by a sputtering method or process at room temperature.

EXAMPLE 3

A carbon layer having a thickness of 0.2 µm is formed on the surface of the stamper 28 by a sputtering method at room temperature.

EXAMPLE 4

A cobalt oxide (CoO) layer having a thickness of 0.2 µm is formed on the surface of the stamper 28 by a sputtering method at room temperature.

EXAMPLE 5

A nickel nitride (NiN) layer having a thickness of 0.1 µm is formed on the stamper 28 by a nitrogen-ion injection or implantation method.

EXAMPLE 6

A titanium nitride (TiN) layer having a thickness of 0.1 µm is formed on the surface of the stamper 28 by using both titanium evaporation or vapor deposition method and a nitrogen-ion injection method.

EXAMPLE 7

A mixed layer of nickel oxide and titanium oxide and a titanium nitride (TiN) layer are formed on the mixed layer by a thickness of 0.1 µm by an oxygen-ion injection method and by a mixture method of titanium evaporation and nitrogen ion injection.

The stampers according to the foregoing examples and a conventional stamper were evaluated by a scratch test method.

Figure 14:
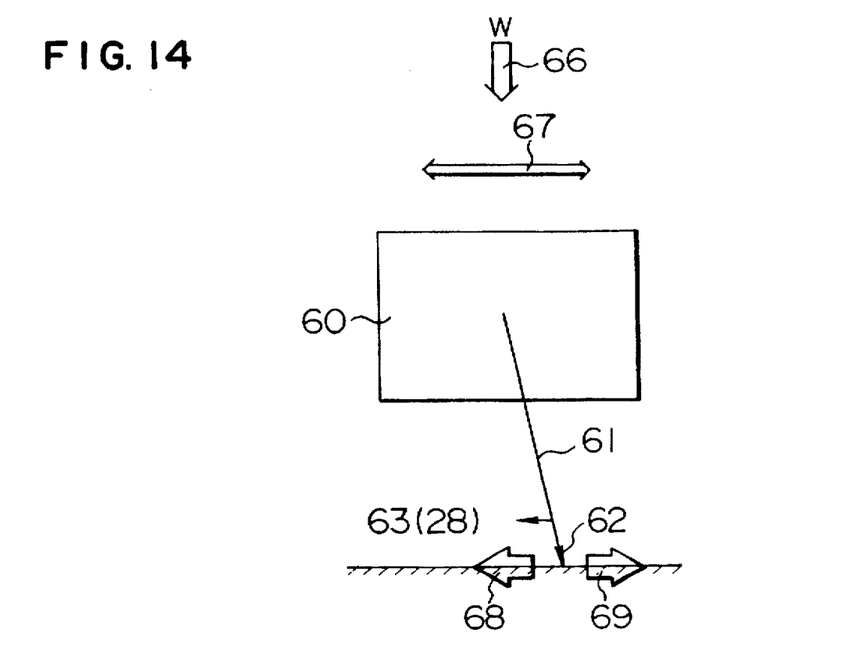
FIG. 14 is a view which illustrates the principle of a scratch test method.
Figure 15:
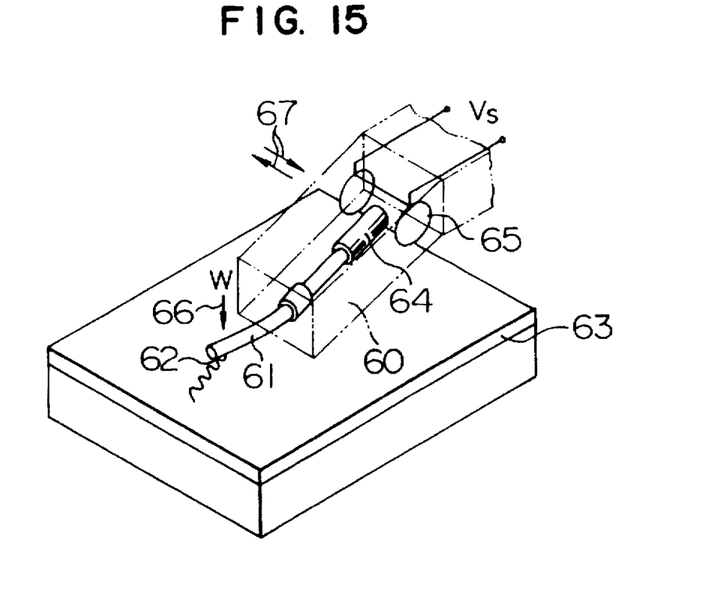
FIG. 15 is a partial perspective view which illustrates a scratch tester arranged on the basis of the scratch test method.

FIGS. 14 and 15 are views which illustrate the scratch test method. FIG. 14 is a view which illustrates the principle of the scratch test method. FIG. 15 is a partially perspective view which illustrates a scratch tester (Scratch Tester ST-101 manufactured by Shimazu Seisakusho Ltd.)

Referring to FIGS. 14 and 15, reference numeral 60 represents a cartridge, 61 represents a cantilever attached to the cartridge 60, 62 represents a sapphire stylus attached to the leading portion of the cantilever 61, 63 represents a sample (the stamper 28), 64 represents a magnet, 65 represents a coil, 66 represents a load, 67 represents directions in which the cartridge 60 is forcibly vibrated, 68 represents restoring force of the stylus 62, 69 represents frictional force of the stylus 62.

The scratch test is performed in such a manner that the stylus 62 is, as illustrated, pressed against the surface of the sample 63 (the stamper 28) under the load (W) 66. Then, the stylus 62 is forcibly vibrated in the horizontal direction (in the vibrating directions 67) by cooperation of the magnet 64 and the coil 65. As a result, both restoring force 68 generated by the cantilever 61 and the frictional force 69 of the sample 63 (stamper 28) act on the stylus 62 as shown in FIG. 14. The scan is performed in a state where the stylus 62 is forcibly vibrated in the horizontal direction to detect the load 66 added to the stylus 62. When the cartridge 60 is vibrated to, for example, the left, the stylus 62 moves after a delay undergoing due to the frictional force 69. The degree of the delay is, as an output (a voltage level) from the cartridge 60, detected.

The angle θ of enlargement of the output from the cartridge 60 when the load is gradually enlarged is obtained. The inverse number (tan $\theta^{-1}$) of tan θ was used to evaluate the characteristics (the composite characteristics of the surface hardness and the friction coefficient) of the surface of the sample 63.

Figure 16:
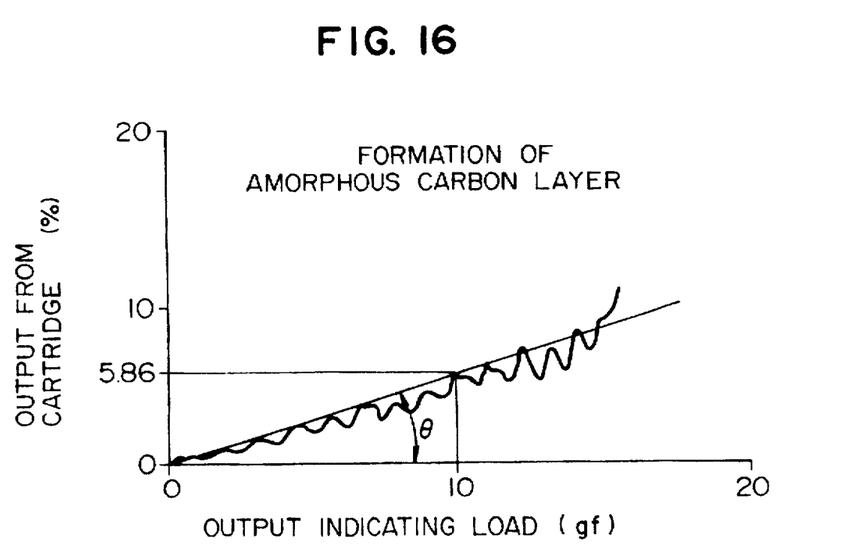
FIG. 16 is a characteristics graph which shows the relationship between outputs indicating or denoting loads of a stamper, on which an amorphous layer obtained in Example 1 is formed on the surface thereof, and outputs from a cartridge.

FIG. 16 is a characteristic graph showing the relationship between outputs indicating or denoting the loads of the stamper having the amorphous layer according to Example 1 formed on the surface thereof and the outputs from the cartridge 60.

Figure 17:
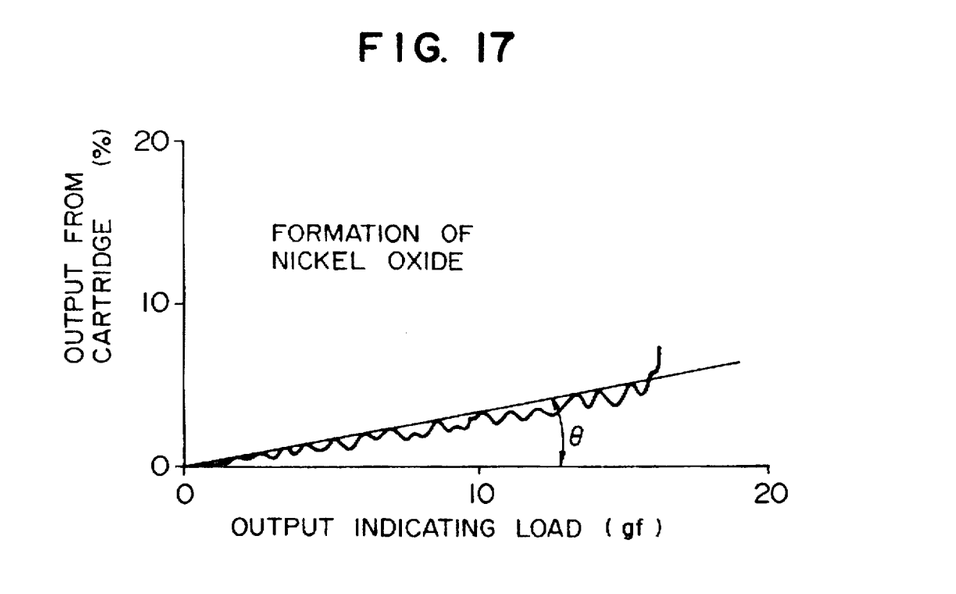
FIG. 17 is a characteristics graph which shows the relationship between outputs denoting loads of a stamper, on which a nickel oxide layer obtained in Example 2 is formed on the surface thereof, and outputs from a cartridge.

FIG. 17 is a characteristic graph showing the relationship between outputs denoting the loads of the stamper having the nickel oxide layer according to Example 2 formed on the surface thereof and the outputs from the cartridge 60.

Figure 18:
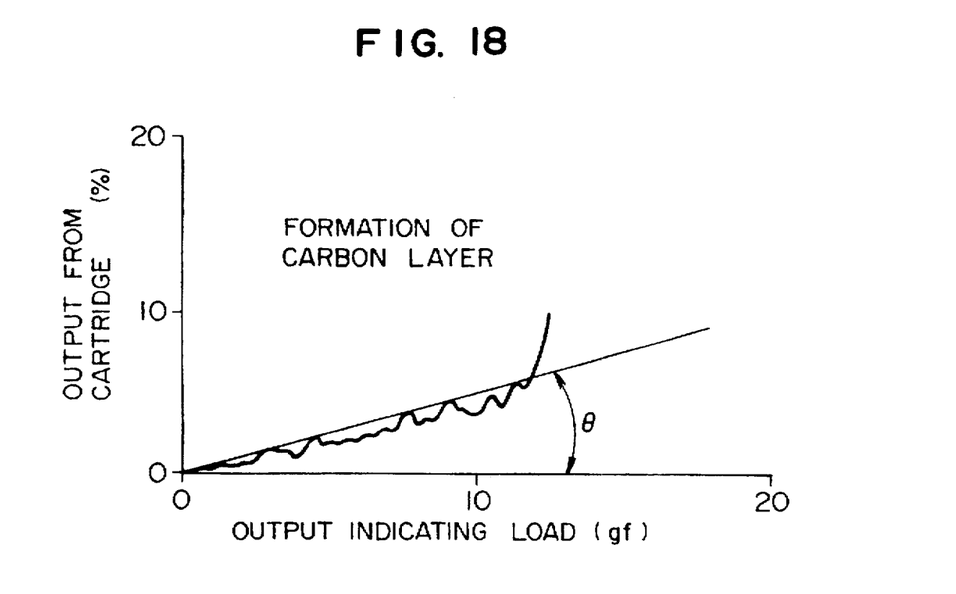
FIG. 18 is a characteristics graph which shows the relationship between outputs denoting loads of a stamper, on which a carbon layer obtained in Example 3 is formed on the surface thereof, and outputs from a cartridge.

FIG. 18 is a characteristic graph showing the relationship between outputs denoting the loads of the stamper having the carbon layer according to Example 3 formed on the surface thereof and the outputs from the cartridge 60.

Figure 19:
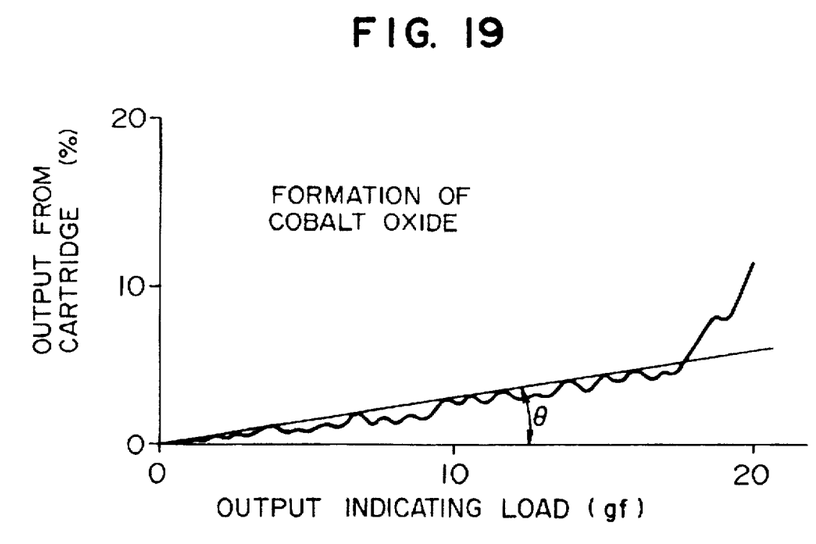
FIG. 19 is a characteristics graph which shows the relationship between outputs denoting loads of a stamper, on which a cobalt oxide layer obtained in Example 4 is formed on the surface thereof, and outputs from a cartridge.

FIG. 19 is a characteristic graph showing the relationship between outputs denoting the loads of the stamper having the cobalt oxide layer according to Example 4 formed on the surface thereof and the outputs from the cartridge 60.

Figure 20:
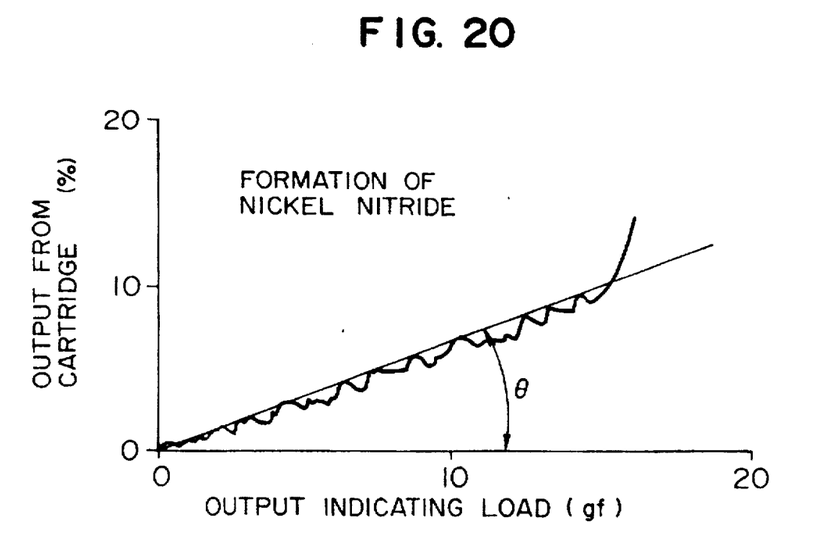
FIG. 20 is a characteristics graph which shows the relationship between outputs denoting loads of a stamper, on which a nickel nitride layer obtained in Example 5 is formed on the surface thereof, and outputs from a cartridge.

FIG. 20 is a characteristic graph showing the relationship between outputs denoting the loads of the stamper having the nickel nitride layer according to Example 5 formed on the surface thereof and the outputs from the cartridge 60.

Figure 21:
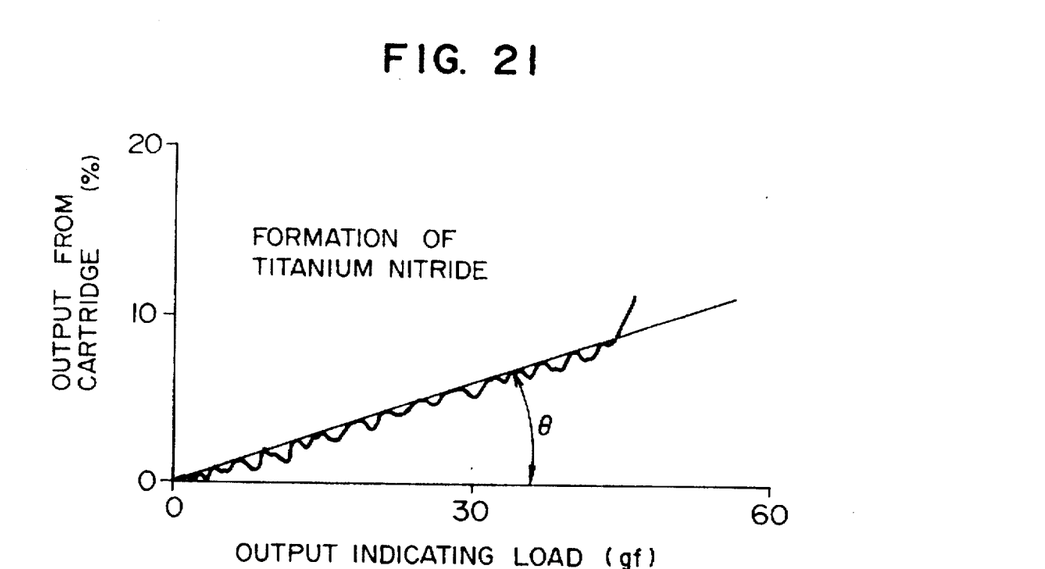
FIG. 21 is a characteristics graph which shows the relationship between outputs denoting loads of a stamper, on which a titanium nitride layer obtained in Example 6 is formed on the surface thereof, and outputs from a cartridge.

FIG. 21 is a characteristic graph showing the relationship between outputs denoting the loads of the stamper having the titanium nitride layer according to Example 6 formed on the surface thereof and the outputs from the cartridge 60.

Figure 22:
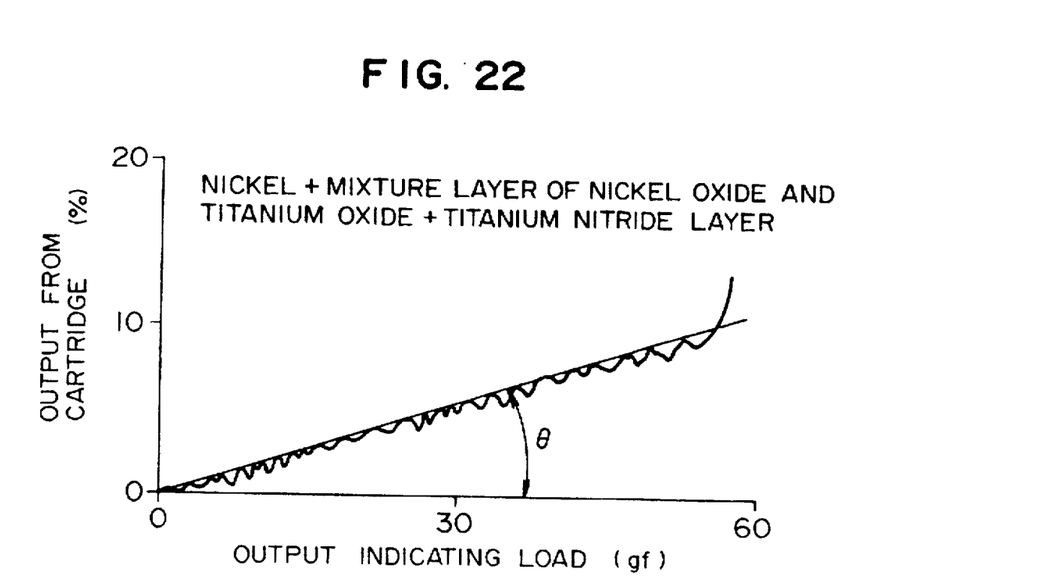
FIG. 22 is a characteristics graph which shows the relationship between outputs denoting loads of a stamper, on which a layer of mixture of nickel oxide and titanium oxide, and a titanium nitride layer obtained in Example 7 are formed on the surface thereof, and outputs from a cartridge.

FIG. 22 is a characteristic graph showing the relationship between outputs denoting the loads of the stamper having the mixed layer of nickel oxide and titanium oxide and the titanium nitride layer according to Example 7 formed on the surface thereof and the outputs from the cartridge 60.

Figure 23:
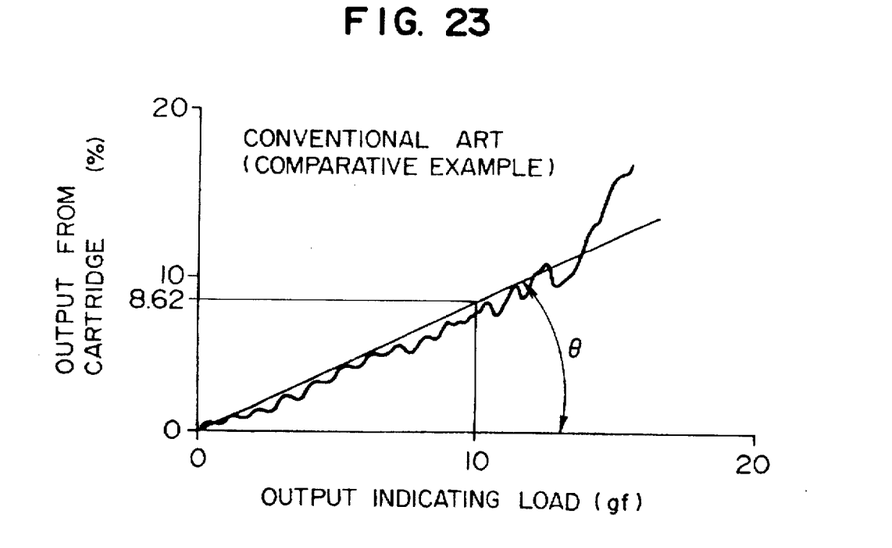
FIG. 23 is a characteristics graph which shows the relationship between outputs denoting loads of a conventional nickel stamper and outputs from a cartridge.

FIG. 23 is a characteristics graph showing the relationship between outputs denoting the loads of the conventional stamper made of nickel and outputs from the stamper.

The following measuring conditions were employed in the scratch test method. In the table below, the loading speed is the speed at which the cartridge body moves downwards. the loading speed is not the speed at which the stylus portion moves downward. The amplitude of the cartridge is the amplitude of vibrations with which the cartridge is forcibly vibrated. The scratch speed is the speed at which the cartridge body is fed. Among the foregoing measuring conditions, the diameter of the stylus and the loading speed are important factors.

| Measuring Conditions | |
| --- | --- |
| Diameter of Stylus | 100 μm |
| Loading Speed | 1 μm/sec |
| Cartridge No. | k0214 |
| Full-Scale Load | 20 gf |
| Amplitude of Cartridge | 100 μm |
| Scratching Speed | 5 μm/sec |

In accordance with the characteristics graph showing the relationship between the outputs denoting the loads and the outputs from the cartridge, the inclination angle q can be obtained. The inverse number (tan $\theta^{-1}$) of tan θ can be calculated on the basis of the inclination angle θ. When the inclination angle θ is obtained from the characteristics graph between the outputs denoting the loads and the outputs from the cartridge, a zigzag line, for example as shown in FIG. 16, is resulted due to the wave of the surface of the sample (the stamper). In the present invention, the angle of inclination of a line drawn from the test commencement point (output denoting the load=0) to each vertex is employed as θ.

The following Table 1 is a table showing values of tan $\theta^{-1}$ of the examples and the conventional example.

TABLE 1

| | Contents | Value of tan $\theta^{-1}$ |
| --- | --- | --- |
| Example 1 | Forming of Amorphous Layer | 1.70 |
| Example 2 | Forming of Nickel Oxide Layer | 3.22 |
| Example 3 | Forming of Carbon Layer | 2.03 |
| Example 4 | Forming of Cobalt Oxide Layer | 3.50 |
| Example 5 | Forming of Nickel Nitride Layer | 1.50 |
| Example 6 | Forming of Titanium Nitride Layer | 5.03 |
| Example 7 | Forming of Mixture Layer of Nickel Oxide and Titanium Oxide + Titanium Nitride layer | 5.50 |
| Conventional Example | No layer formed (nickel only) | 1.16 |

Table 2 is a graph showing the relationship between the values of tan $\theta^{-1}$ and the durable lives (the number of shots) of the stamper realized after the value of tan $\theta^{-1}$ are varied.

TABLE 2

| Values of tan θ⁻¹ | Number of Shots |
| --- | --- |
| 1.16 | 300 |
| 1.30 | 700 |
| 1.70 | 1000 |
| 2.03 | 1300 |
| 3.22 | 1800 |
| 4.10 | 2300 |
| 5.50 | 4000 |
| 10.0 | 10000 |

As can be understood from the table above, the conventional stamper has a low value of tan $\theta^{-1}$ of 1.16 and therefore the number of shots encounters a limit of about 300. If the value of tan $\theta^{-1}$ is 1.3 or more, preferably 1.7 or more, further preferably 2 or more, the number of shots can be enlarged. Thus, it can be confirmed that the stamper in the foregoing case has excellent durability.

As can be understood from the foregoing examples, the value of tan $\theta^{-1}$ can be adjusted to a predetermined value by selecting the material and thickness of the base of the stamper, the type and quantity of injected ions, the material and thickness of the hard film and their combination.

Although the largest value of the tan $\theta^{-1}$ is not limited particularly, there is a tendency that enlargement of tan $\theta^{-1}$ generally make the material brittle. Therefore, it is preferable that the value of tan $\theta^{-1}$ be limited to about 10.

Although the magnetic disk has been described in the foregoing examples, the present invention is not limited to this. The present invention can be applied to a stamper for manufacturing a magnetic recording medium in another form, for example, a magnetic tape or magnetic card or a stamper for manufacturing an optical recording medium such as an optical disk.

FIGS. 24 to 27 are cross sectional views which illustrate a method of manufacturing an optical disk by using the stamper.

Figure 24:
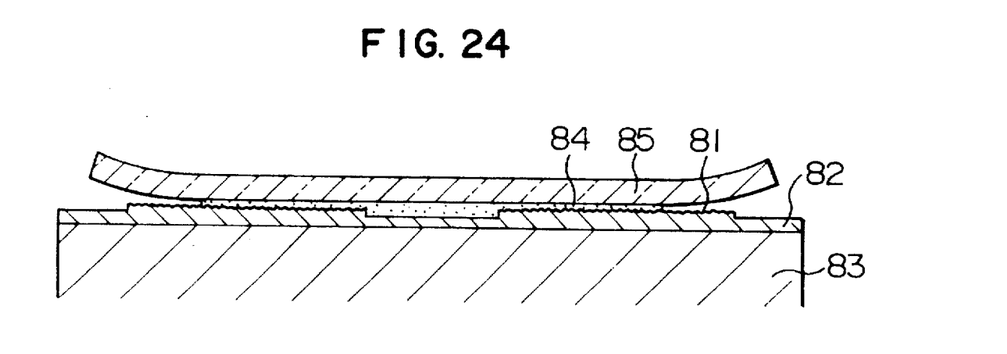
FIG. 24 is a cross sectional view which illustrates a method of producing or manufacturing an optical disk by using the stamper.

A stamper 82 having fine grooves 81 in the form of concentric circles corresponding to pre-grooves (and/or prepits, see FIGS. 26 and 27) is secured on a base 83. The stamper 82 is made of nickel only or nickel-base alloy containing cobalt and phosphorus in a small quantity. An amorphous layer, nickel oxide layer, carbon layer or cobalt oxide layer (omitted from illustration) is formed on the surface of the stamper on which the foregoing grooves 81 are formed. The stamper has a value of tan $\theta^{-1}$ of 1.3 or more, preferably 1.7 or more.

Figure 25:
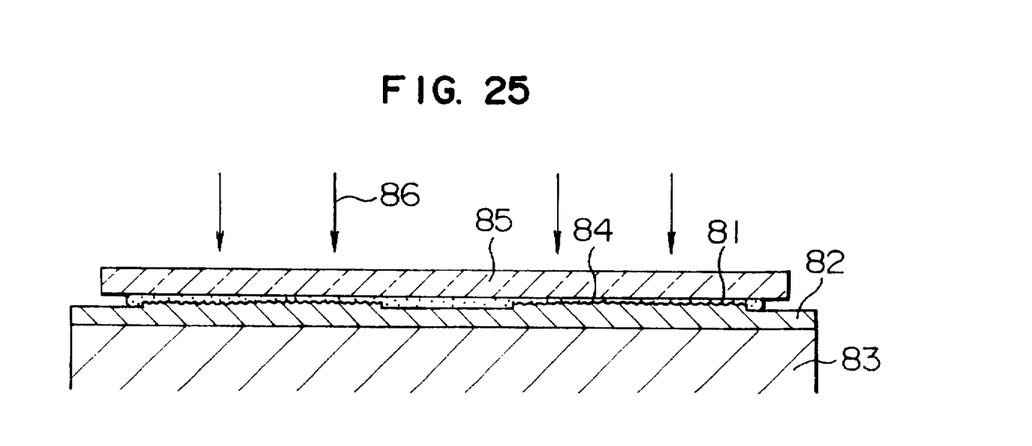
FIG. 25 is a cross sectional view which illustrates a method of manufacturing an optical disk by using the stamper.
Figure 26:
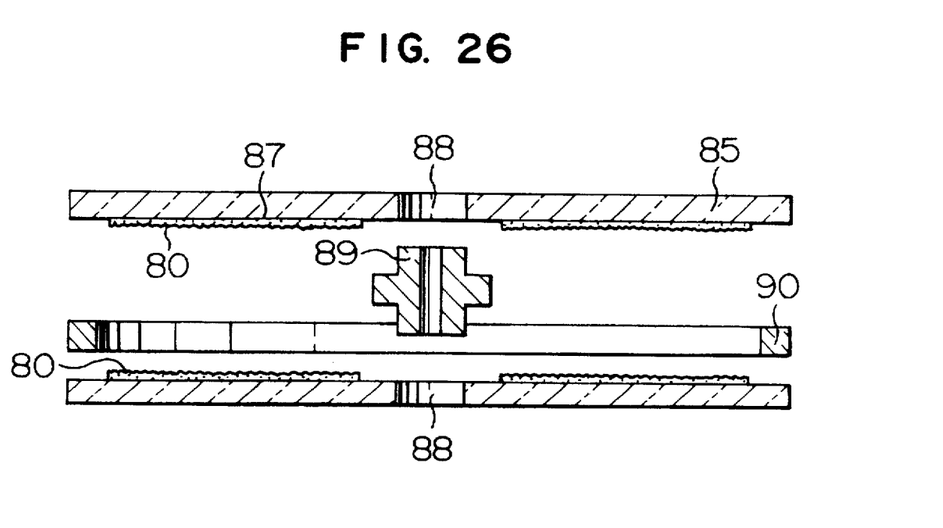
FIG. 26 is a cross sectional view which illustrates a method of manufacturing an optical disk by using the stamper.

As shown in FIG. 25, uncured ultraviolet-cured-type resin 84 having fluidity is dripped on the stamper 82, and then a disk substrate 85 made of transparent material such as glass is pressed on the ultraviolet-cured-type resin 84 in a state where the disk substrate 85 is somewhat warped with its central portion positioned downwards. Then, the peripheral portion is moved downwards gradually to be placed on the stamper 82. When the disk substrate 85 is pressed against the stamper 82, the ultraviolet-cured-type resin 84 is spread toward the peripheral portion without bubbles while being injected into the grooves 81.

Then, the disk substrate 85 is, as shown in FIG. 25, irradiated with ultraviolet rays 86 from an upper position so that the ultraviolet-cured-type resin 84 is cured. Then, the disk substrate 85 is separated from the stamper 82, causing also the cured resin film to be separated from the stamper 82 together with the disk substrate 85. As a result, a recording film 87 having the pregrooves 80 is formed. Thus, a replica process is completed.

Figure 27:
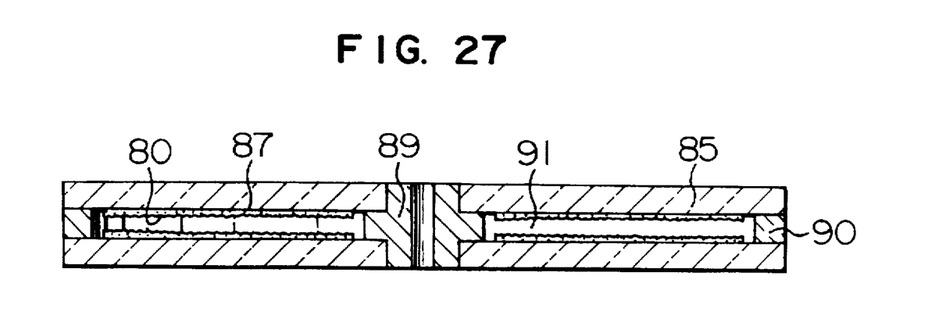
FIG. 27 is a cross sectional view which illustrates the optical disk manufactured by the stamper.

Then, the pregrooves 80 are used to optically detect the central position of the disk substrate 85. In accordance with the detected central position, a central hole is formed in the disk substrate 85. A center hub 89 and a peripheral spacer 90 are bonded and combined with the disk substrate 85 and the central hole 88, thus enabling an air-sandwich type optical disk including a space 91 as shown in FIG. 27 to be manufactured.

The first to fourth aspects of the present invention enables a hard (500 or more Vickers hardness) stamper to be obtained. Moreover, if it is used for a long time, deformation of the projections and pits can be prevented, thus elongating the life of the stamper.

The fifth aspect of the present invention is arranged in such a manner that the base of the stamper is cut to have a predetermined size and the curing process is performed. Therefore, the blade portion of the cutting machine can be prevented, thus enabling the cutting machine to be used continuously, thereby realizing excellent mass production facility.

As many apparently widely different embodiments of this invention may be made without departing from the spirit and scope thereof, it is to be understood that the invention is not limited to the specific embodiments thereof except as defined in the appended claims.

What is claimed is:

1. A stamper for producing a recording medium comprising a surface layer having projections and pits in a predetermined pattern thereon, wherein a value of tan $\theta^{-1}$, obtainable from an enlargement angle θ of an output from a cartridge with respect to an enlargement of an output indicating a load measured by a test of scratching said surface layer having said projections and pits under conditions that a diameter of a stylus is 100 μm and a loading speed of the stylus is 1 μm/second, is 1.3 or more wherein said stamper further comprises:
at least a base layer, an intermediate layer formed on said base layer and a hard layer formed on said intermediate layer, said surface layer being disposed on said hard layer, wherein said base layer is made of nickel, said intermediate layer is made of a nickel oxide or a mixed substance of a nickel oxide and a titanium oxide, and said hard layer is made of titanium nitride,
a mixed-element region formed between said base layer and said intermediate layer in which main elements for forming said base layer and forming said intermediate layer are mixed with one another, and
wherein said hard layer is formed by growth of crystal on a surface of said intermediate layer.

2. A stamper for producing a recording medium according to claim 1, wherein a nickel nitride is present in the surface layer of said stamper having said projections and pits.

3. A stamper for producing a recording medium according to claim 1, wherein a titanium nitride film is formed on the surface layer of said stamper having said projections and pits.

4. A stamper for producing a recording medium according to claim 1, wherein said intermediate layer is made of a nickel oxide and a titanium oxide.

* * * * *